(12) United States Patent
Conzola et al.

(10) Patent No.: US 8,495,497 B2
(45) Date of Patent: Jul. 23, 2013

(54) GRAPHICAL GUIDES TO AID USER SELECTION OF GROUPS OF INSTRUCTION PACKAGES

(75) Inventors: Vincent C. Conzola, Raleigh, NC (US); Todd M. Eischeid, Cary, NC (US); David B. Lection, Raleigh, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 12/695,746

(22) Filed: Jan. 28, 2010

(65) Prior Publication Data

US 2011/0185304 A1 Jul. 28, 2011

(51) Int. Cl.
*G06F 15/177* (2006.01)

(52) U.S. Cl.
USPC ............................ 715/735; 715/854; 717/175

(58) Field of Classification Search
USPC ............................ 715/772, 735, 854; 717/175
See application file for complete search history.

(56) References Cited

U.S. PATENT DOCUMENTS

| | | | | |
|---|---|---|---|---|
| 5,630,069 | A * | 5/1997 | Flores et al. .................. | 705/7.27 |
| 6,219,053 | B1 * | 4/2001 | Tachibana et al. ............ | 715/835 |
| 6,331,983 | B1 * | 12/2001 | Haggerty et al. ............. | 370/400 |
| 6,374,202 | B1 * | 4/2002 | Robinson ....................... | 703/13 |
| 6,393,507 | B2 * | 5/2002 | Klein ............................. | 710/313 |
| 6,571,146 | B1 * | 5/2003 | Dennehy ........................ | 700/98 |
| 6,792,475 | B1 * | 9/2004 | Arcuri et al. .................. | 709/245 |
| 7,062,718 | B2 * | 6/2006 | Kodosky et al. .............. | 715/771 |
| 7,120,926 | B1 | 10/2006 | Safadi et al. | |
| 7,146,412 | B2 | 12/2006 | Turnbull | |
| 7,825,792 | B2 * | 11/2010 | Buehler ......................... | 340/506 |
| 7,908,354 | B2 * | 3/2011 | Fernandez Gutierrez .... | 709/223 |
| 7,921,198 | B2 * | 4/2011 | Fernandez Gutierrez .... | 709/223 |
| 2002/0013837 | A1 * | 1/2002 | Battat et al. ................... | 709/223 |
| 2002/0024535 | A1 * | 2/2002 | Ueno et al. .................... | 345/736 |
| 2004/0243993 | A1 | 12/2004 | Okonnen et al. | |
| 2006/0212665 | A1 | 9/2006 | Lin et al. | |
| 2006/0248159 | A1 * | 11/2006 | Polan ............................ | 709/208 |
| 2007/0130362 | A1 * | 6/2007 | Oommen et al. ............. | 709/238 |
| 2007/0250830 | A1 | 10/2007 | Holmberg et al. | |
| 2008/0184220 | A1 | 7/2008 | Chen et al. | |
| 2008/0201705 | A1 * | 8/2008 | Wookey ........................ | 717/175 |

(Continued)

FOREIGN PATENT DOCUMENTS

EP 1930808 A1 11/2008

OTHER PUBLICATIONS

Wavelink Corporation, "Understanding Infrastructure Device Firmware in Avalanche MC", http://www.wavelink.com/orders/files/amc-wp-infrastructure-firmware-20070813.pdf, Aug. 17, 2007, pp. 1-6. U.S.

*Primary Examiner* — Phenuel Salomon
(74) *Attorney, Agent, or Firm* — Kenneth L. Sherman, Esq.; Michael Zarrabian, Esq.; Sherman & Zarrabian LLP

(57) ABSTRACT

The invention provides a method and system for graphically mapping compatible processing updates. The method includes employing a processor for tracking updates for processing instruction packages. The method further includes determining compatibility between each of the processing instruction packages. The method additionally includes linking combinations of compatible processing instruction packages together. The method also includes providing a map of one or more combinations of linked compatible processing instruction packages and tracked updates for the plurality of processing instruction packages to a graphical user interface for facilitating selection of tracked updates for the plurality of processing instruction packages.

17 Claims, 9 Drawing Sheets

U.S. PATENT DOCUMENTS

2008/0209449 A1* 8/2008 Maehira ................ 719/321
2010/0214313 A1* 8/2010 Herman et al. ............ 345/593
2011/0225577 A1* 9/2011 Wookey ................ 717/175

* cited by examiner

| 205 | 210 |
|---|---|
| Advanced Systems Management | |
| Automatic Server Restart IPMI Application v1.10 for Microsoft Windows 2000 and Windows Server 2003 | 27 Jun 2008 v1.10 |
| Adapter (BIOS) | |
| IBM Ultra320 SCSI controller BIOS and firmware | 04 Mar 2008 v4.30.2 |
| Baseboard Management Controller (BMC) | |
| Baseboard Management Controller (BMC) firmware update v1.44 (DOS package) | 14 May 2008 v1.44 |
| Baseboard Management Controller (BMC) firmware update v1.44 (Microsoft Windows package) | 14 May 2008 v1.44 |
| System Management Bridge BMC CLI and Remote Console Utility v.2.0.23.1 | 15 Jan 2008 v2.0.23.1 |
| BIOS | |
| IBM Advanced Settings Utility (ASU) v2.4.1 | 11 Jun 2008 v2.4.1 |
| Flash BIOS update (DOS package) v1.10 | 13 May 2008 v1.10 |
| Flash BIOS update (Windows package) v1.10 | 13 May 2008 v1.10 |
| ASU BIOS Definition file | 07 Sep 2007 v1.06 |
| ASU BIOS Definition file | 19 Apr 2007 v1.05 |
| BIOS Definition File | 14 Feb 2007 v1.04 |
| BIOS definition file for use with the Advanced Settings Utility | 22 Nov 2006 v1.0 |
| BIOS definition file v1.01 for use with IBM Advanced Settings Utility | 27 Jul 2006 v1.01 |
| BIOS Definition File | 09 Jun 2006 v1.0 |
| Chipset | |
| Intel(R) 5000 Series Chipsets Integrated Device Driver (DMA) v1.00 | 07 Apr 2008 v1.0.0 |

FIG. 2

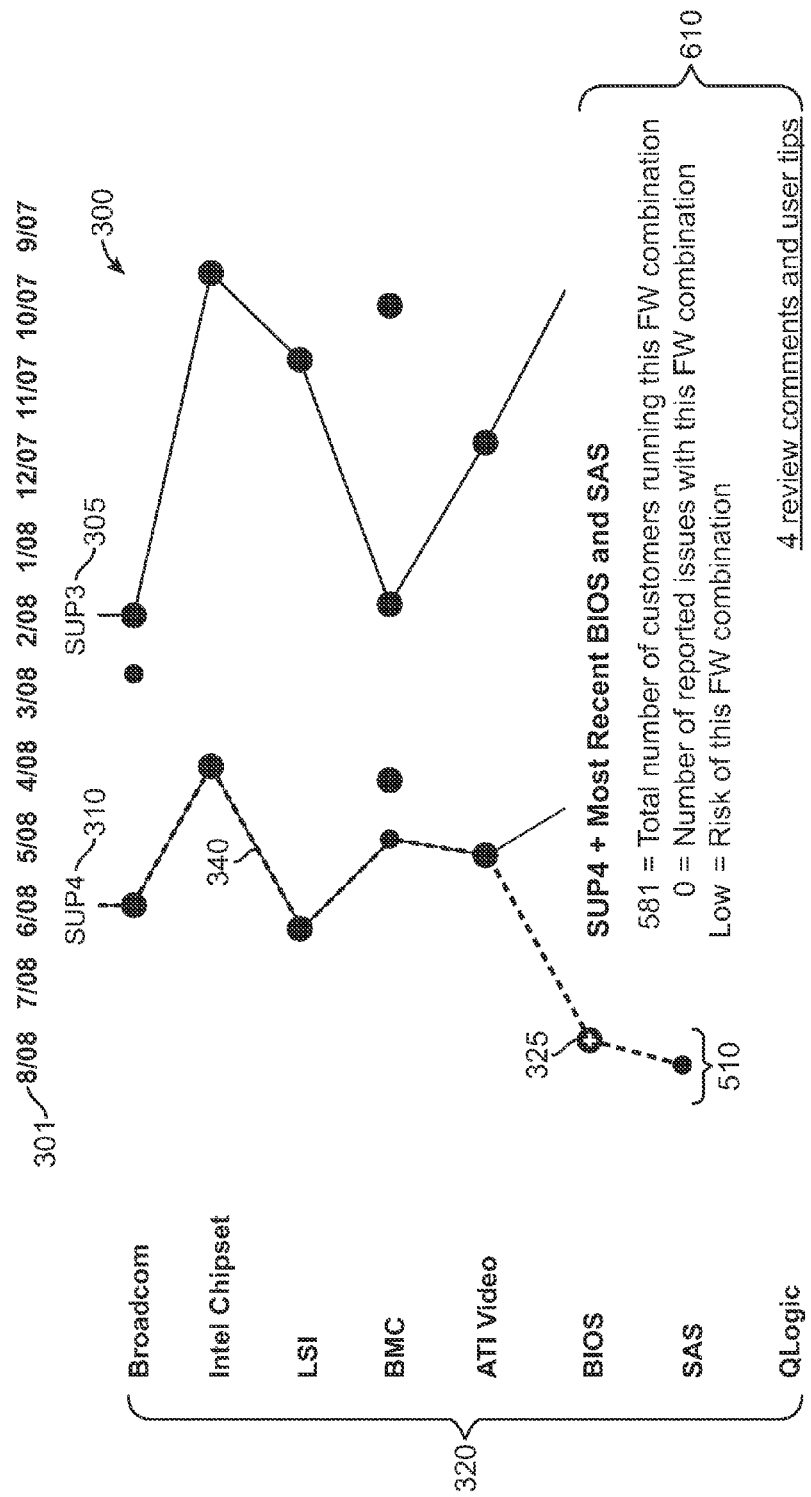
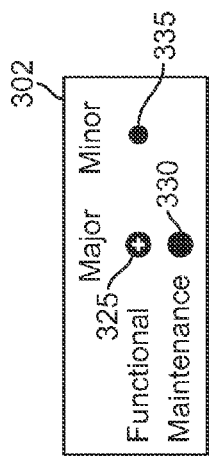
FIG. 6

GRAPHICAL GUIDES TO AID USER SELECTION OF GROUPS OF INSTRUCTION PACKAGES

BACKGROUND OF THE INVENTION

1. Field of the Invention

The present invention relates generally to graphically representing processing instruction packages, and in particular to mapping compatible processing instruction packages.

2. Background Information

System administrators may handle many different systems, each including a multitude of devices that require installing updates, such as firmware. The installation of device or system updates can be very time consuming, and which can be exacerbating in case of compatibility issues. For example, firmware for several different devices may need to be compatible to operate with a server device. If any of the firmware is incompatible, errors may occur due to improper operation of the devices. Determining the cause of the errors can be time consuming as device firmware may need to be rolled back to the point before the errors were detected. In other cases, a single update may have a problem, known as a "bug," that needs correction. The single update, however, may be newer than other updates, and may not have been tested with other new updates or previous updates, which can lead to further device errors.

BRIEF SUMMARY OF THE INVENTION

One embodiment of the invention provides a method and system for providing a map of one or more combinations of linked compatible processing instruction packages and tracked updates to a graphical user interface.

One embodiment of the invention comprises an apparatus including a processor coupled to a tracking module that is configured to track updates for a plurality of processing instruction packages. The apparatus further comprises a compatibility module configured to determine compatibility between each of the plurality of processing instruction packages. The apparatus further comprises a linking module configured to link combinations of compatible processing instruction packages together. The apparatus further comprises a mapping module configured to provide a map of one or more combinations of linked compatible processing instruction packages and provide tracked updates for the plurality of processing instruction packages to a user interface module as output for facilitating selection of updates for the plurality of processing instruction packages.

In another embodiment of the invention, a system comprises a server device including a tracking module that is configured to track updates for a plurality of processing instruction packages. A compatibility module is configured to determine compatibility between each of the plurality of processing instruction packages. A linking module is configured to link combinations of compatible processing instruction packages together. A mapping module is configured to provide a map of one or more combinations of linked compatible processing instruction packages and provide tracked updates for the plurality of processing instruction packages as output for facilitating selection of tracked updates for the plurality of processing instruction packages.

Another embodiment of the invention provides a method comprising employing a processor for tracking updates for a plurality of processing instruction packages. Determining compatibility between each of the plurality of processing instruction packages. Linking combinations of compatible processing instruction packages together. Providing a map of one or more combinations of linked compatible processing instruction packages and tracked updates for the plurality of processing instruction packages to a graphical user interface for facilitating selection of tracked updates for the plurality of processing instruction packages.

Another embodiment of the invention provides a computer program product for mapping compatible processing instruction packages comprising: a computer usable medium having computer readable program code embodied therewith, the computer readable program code comprising: computer readable program code configured to track updates for a plurality of processing instruction packages. Determine compatibility between each of the plurality of processing instruction packages. Link combinations of compatible processing instruction packages together. Provide a map of one or more combinations of linked compatible processing instruction packages and tracked updates for the plurality of processing instruction packages to a graphical user interface for facilitating selection of tracked updates for the plurality of processing instruction packages.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which:

FIG. 2 illustrates a sample of types of updates a system administrator may have to install;

FIG. 6 illustrates an example user interface showing additional information regarding possible incompatible update processing instruction packages according to one embodiment of the invention;

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for providing a map of one or more combinations of linked compatible processing instruction packages and tracked updates to a graphical user interface, as well as operation and/or component parts thereof. While the following description will be described in terms of mapping and tracking processing instruction packaging systems and processes for clarity and placing the invention in context, it should be kept in mind that the teachings herein may have broad application to all types of systems, devices and applications.

The embodiments of the invention save time and reduce errors in downloading instruction packages, such as updates, firmware, software downloads, device drivers, definitions, libraries, etc. Since different systems may vary as to devices, operating systems, etc., the embodiments allow selection of customizable instruction package update choices for compatible instruction packages, and also allow experimentation by allowing a user to choose different instruction packages to see what a potential impact may be.

One embodiment of the invention provides a method and system for providing a map of one or more combinations of linked compatible processing instruction packages and tracked firmware and device driver updates to a system such as a computing device or storage device. In one implementation, a processing instruction package comprises multiple updates, firmware, software downloads, device drivers, definitions, libraries, etc.

One embodiment of the invention comprises an apparatus including a processor coupled to a tracking module that is configured to track updates for a plurality of processing instruction packages. The apparatus further comprises a compatibility module configured to determine compatibility between each of the plurality of processing instruction packages. The apparatus further comprises a linking module configured to link combinations of compatible processing instruction packages together. The apparatus further comprises a mapping module configured to provide a map of one or more combinations of linked compatible processing instruction packages and provide tracked updates for the plurality of processing instruction packages to a user interface.

Figure 1:
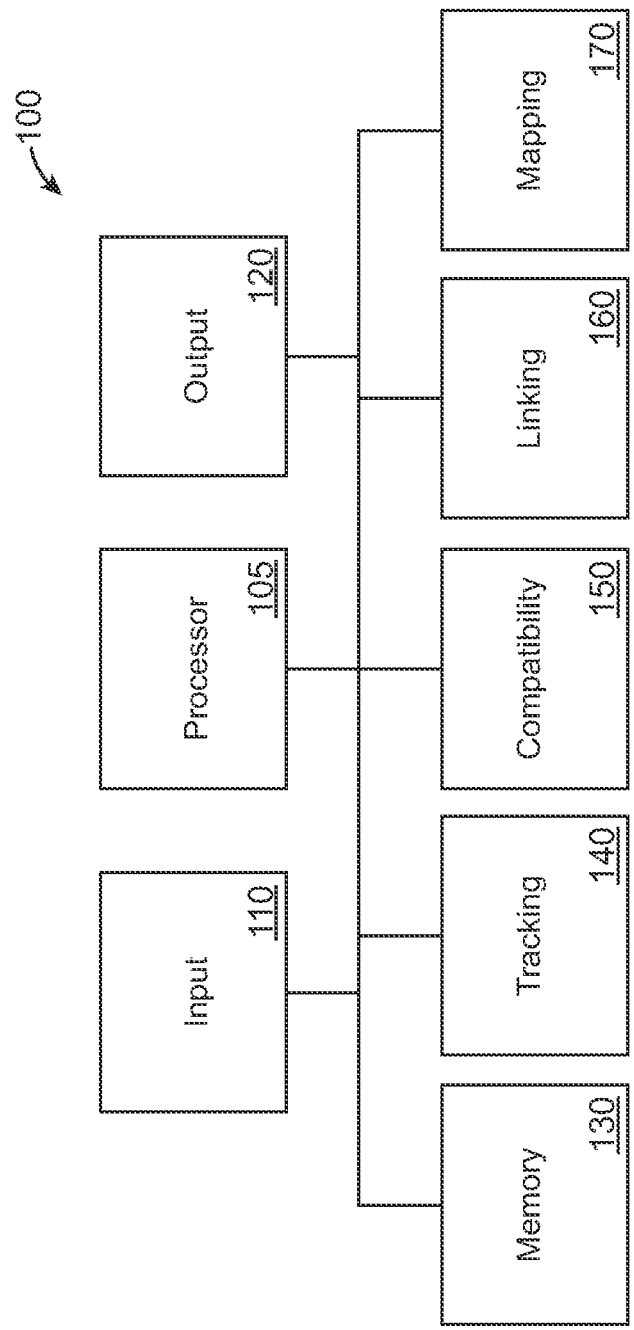
FIG. 1 illustrates a system device according to one embodiment of the invention.

FIG. 1 illustrates one embodiment of the invention of a system 100 comprising a processor 105, an input module/device 110, an output module/device 120, a memory 130, a tracking module/device 140, a compatibility module/device 150, a linking module/device 160 and a mapping module/device 170. In one or more embodiments of the invention the memory 130 may be distributed in multiple separate or combined memory devices, etc. The system 100 provides a graphical map of one or more combinations of representations of linked compatible processing instruction packages and tracked updates to the output module 120. The various processing instruction packages may include instructions that are machine/device/system usable or readable. In one embodiment of the invention, the processor 105 may assist in performing processing related to the input module 110, the output module 120, the memory 130, the tracking module 140, the compatibility module 150, the linking module 160 and the mapping module 170.

FIG. 2 illustrates various examples of systems and device types 205 with update descriptions 206 listed underneath the system/device types 205 with release date and version information 210, where the information for the tracked updates for the systems and devices types 205 may be utilized by the system 100 (FIG. 1) for providing graphical representations of linked compatible processing instruction packages to facilitate selection of tracked updates according to an embodiment of the invention. As illustrated, some examples of system and device types 205 may include Advanced System Management, Adapter Basic Input Output System (BIOS), Baseboard Management Controller (BMC), BIOS, Chipset, etc.

In one example, the memory 130 (FIG. 1) is implemented in one or more of the following types of machine-readable memories: semiconductor firmware memory, programmable memory, non-volatile memory, read only memory, electrically programmable memory, random access memory, flash memory, magnetic disk memory, and/or optical disk memory, memory device arrays, virtual memory space using a memory device, etc. Either additionally or alternatively, the memory 130 may comprise other and/or later-developed types of computer-readable memory.

In one embodiment of the invention, the input module 110 is configured for receiving one or more selections from a user to select a mapped graphical representation of linked compatible processing instruction packages that have been tracked by the tracking module 140 for information, such as release date, type of device the instruction package has been targeted for, type of tracked update (e.g., Basic Input Output System (BIOS), processor update, operating system updates, system definitions, firmware updates, upgrade instructions, etc.), and assigned importance (e.g., major, minor, etc.) from, e.g., the issuing company, a system administrator, etc., that is stored in the memory 130. In one implementation, the tracking module 140 uses a storage means, such as a database, a matrix, an array, etc., stored in the memory 130 for keeping track of release dates for each processing instruction package and the associated instruction package information in a historical context.

In one embodiment of the invention, the tracking module 140 maintains track of the system models that an instruction package supports in addition to system type, version number, etc. In one example, the instruction package information is provided by the releasing publisher. In some embodiments of the invention additional information regarding the processing instruction packages, such as usage information, user ratings, errors/bugs, etc., may be tracked based on received information from, for example, users, system administrators, etc.

In one embodiment of the invention, compatibility between processing instruction packages is determined by the compatibility module 150 based on heuristics, including compatibility information, issues, etc., known by the publisher, known testing results by various organizations, user information based on user ratings and usage history through shared communication channels (e.g., surveys, blogs, chats, forums, etc.), rules established by organizations, tolerance thresholds, error reports captured by organizations, such as user forums, feedback to publishers, etc.

In one embodiment of the invention, compatibility information regarding the various processing instruction packages can be stored in a database, a matrix, an array, etc., and stored in the memory 130. In one embodiment of the invention, a corresponding compatibility status indicator may be used to indicate whether compatibility between the various processing instruction packages has a status of compatible, incompatible, or unknown. In one implementation, the processing instruction packages known to be compatible may be used to form a group comprising all of the known compatible processing instruction packages. Also, each instruction package might contain just a single item, such as a firmware update file.

In one embodiment of the invention, the compatibility information determined by the compatibility module 150 is retrieved from the memory 130 by the linking module 160 to form links between graphical representations of the information regarding the tracked and linked processing instruction packages based on the compatibility status indicator. In one implementation, the links may be pointers to memory locations in a database, matrix, etc., between stored instruction package information. In another implementation, the links may be link indicators entered in a database, matrix, etc., to indicate the different possible combinations of processing instruction packages that may be linked together for informing a user of compatibility information or issues (i.e., known compatibility, known errors, etc.). In another implementation, the linking module 150 may form lists of processing instruction packages that may be safely combined based on known compatibility.

In one embodiment of the invention, the mapping module 170 retrieves the tracking information gathered by the tracking module 140, the compatibility information determined from the compatibility module 150, and the link information determined by the linking module 160 from the memory 130. The retrieved information is used by the mapping module 170 to generate a graphical representation of the information regarding the tracked and linked processing instruction packages to transmit to the output module 120.

In one embodiment of the invention, the mapping module 170 may generate a graphic representation comprising symbols representing processing instruction packages that are graphically linked together in a graphical path for known compatible processing instruction packages. In one implementation, processing instruction packages that are not compatible with the graphically linked processing instruction packages are represented as unlinked or standalone graphical symbols. In one or more embodiments of the invention, if a user wants to determine a potential compatibility issue for an instruction package that is represented as a standalone graphical symbol, he or she may select the graphical linked path (e.g., with a pointing device), and drag the graphical linked path over to the standalone graphical symbol.

The mapping module 170 sends the newly selected instruction package identification to the linking module 160, which sends linking information regarding the newly selected information package and any other linked processing instruction packages that were determined to be compatible by the compatibility module 150. The mapping module 170 then generates a new graphical representation of a linked path between compatible processing instruction packages and transmits the new graphical representation to the output module 120 to update the system 100. Based on the graphically linked paths between processing instruction packages, a selection of tracked updates for processing instruction packages may be facilitated for users by giving them guidance to the optimal set or sets of processing instruction packages, which helps reduce experimentation and potentially selecting a suboptimal instruction package in the set. In one embodiment of the invention, graphical highlighting used for mapping is different for the recommended set of items and the user's selected set, which might diverge based on compatibility issues.

In one or more embodiments of the invention, a user selection may be entered into the input module 110 by using devices, such as a keyboard, a selection via a pointing device (e.g., a mouse), voice commands converted into text, resistive digitizers (i.e., touch-screens), etc. In one example, a user selection may include one or more selections of symbols representing processing instruction packages for tracked updates to various devices/systems. In another example, a user may drag a graphical representation of a linked path over to an unlinked symbol representing an instruction package that is not part of a group of compatible tracked updates. In yet another example, a user may enter information regarding trial and error installations processing instruction packages via the input module 110 for surveys, blogs, chats, discussions, etc., that may be used as help information to be displayed on the system 100 via the output module 120.

Figure 3:
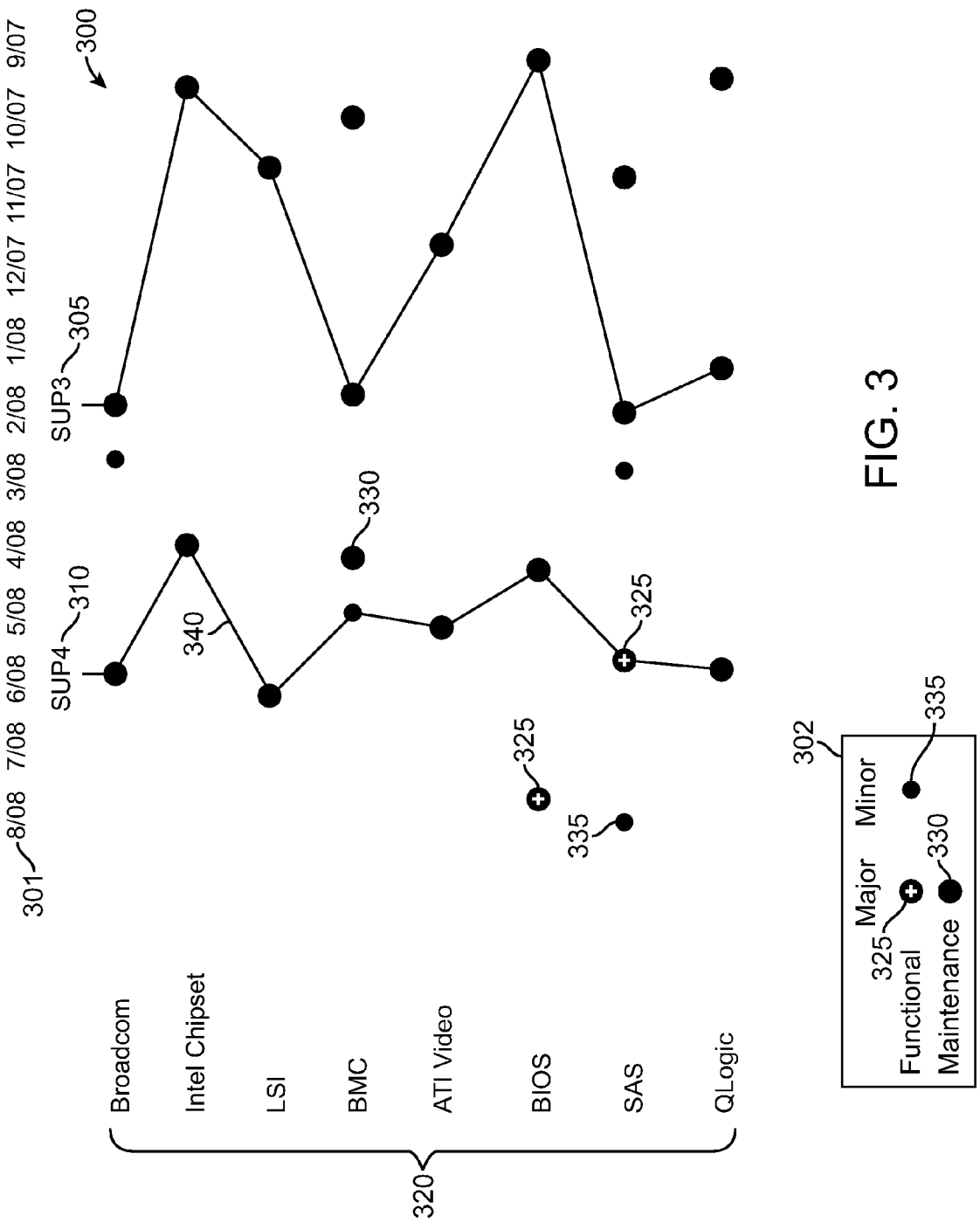
FIG. 3 illustrates an example user interface showing compatible update processing instruction packages prior to input selections according to one embodiment of the invention.

FIG. 3 illustrates an example of a graphical user interface (GUI) 300 generated by the system 100, according to one embodiment of the invention. As illustrated, the example GUI 300 includes a date axis 301 used for aligning representations of tracked update packages with release dates by the mapping module 170. In this example, a listing of tracked update instruction package types 320 corresponds with symbols shown graphically corresponding to respective release dates along the date axis 301.

In an example of one embodiment of the invention, a SUP3 305 and a SUP4 310 include links 340 (determined by the linking module 160 and generated by the mapping module 170) that connect the symbol representations of the processing instruction packages together in graphically formed paths. In some embodiments of the invention, the symbols used for representing the processing instruction packages are varied based on importance, type of tracked update (e.g., functional, maintenance, etc.), processing instruction packages (e.g., firmware updates) that should, or even must be installed together, etc. In other embodiments of the invention, the symbols used for representing the processing instruction packages are varied based on a subset of processing instruction packages (e.g., firmware updates) that may be installed together, etc. As used here, the term "SUP" refers to a group of compatible tracked updates.

In one implementation, an instruction package for a functional tracked update that has an importance assigned as "Major" is represented as symbol 325; an instruction package for a functional tracked update that has an importance assigned as "Minor" is represented as symbol 335; and instruction package for a maintenance tracked update that has an importance assigned as "Major" is represented as symbol 330. In one implementation, the GUI 300 includes a symbol reference area 302 to assist a user in understanding the symbols displayed on the GUI 300.

In one implementation of GUI 300, a user may enter individual selections regarding devices or systems to form the listing of update processing instruction package types 320 that he or she may be interested in finding information regarding processing instruction package updates. In one example, the listing of update processing instruction package types 320 may be selected from a list, e.g., a drop down menu, manually entered, etc.

In another implementation, a user enters information regarding the system and devices that are currently used in a network. In yet another implementation, the system and device information regarding the network the user desires information for may be automatically determined by administration tools, license information, system logs, personalized web portal on the vendor's support web site, etc.

Figure 4:
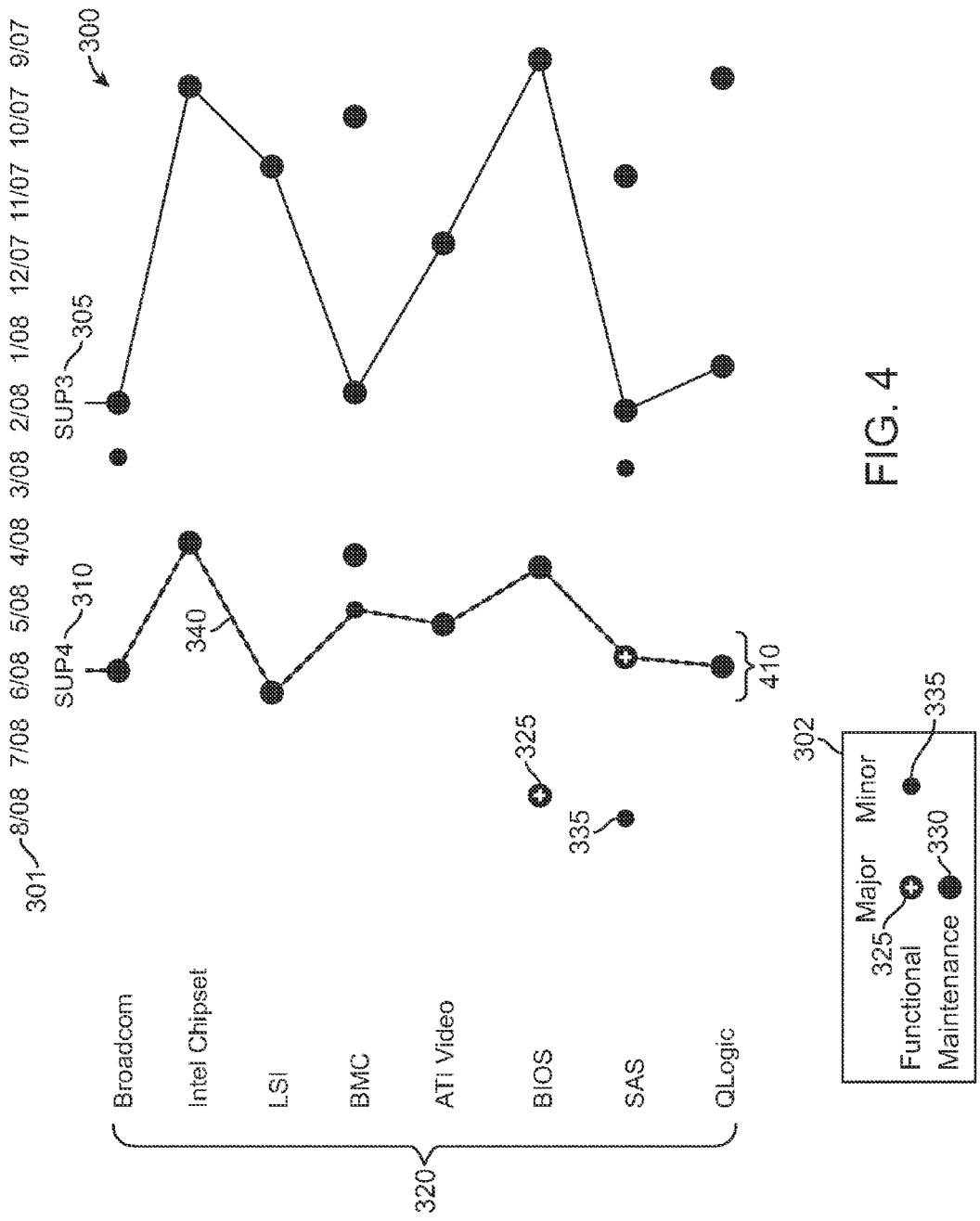
FIG. 4 illustrates an example user interface showing compatible update processing instruction packages including an input selection of compatible update processing instruction packages according to one embodiment of the invention.

FIG. 4 illustrates the example GUI 300 where a user selection of a group of compatible tracked updates, denoted as SUP4, 310 has been made. In this example, the graphically linked path 410 of the processing instruction packages in SUP4 310 are now highlighted to show a user that all of the processing instruction packages in the path 410 are compatible if installed together on a system/device/network.

Figure 5:
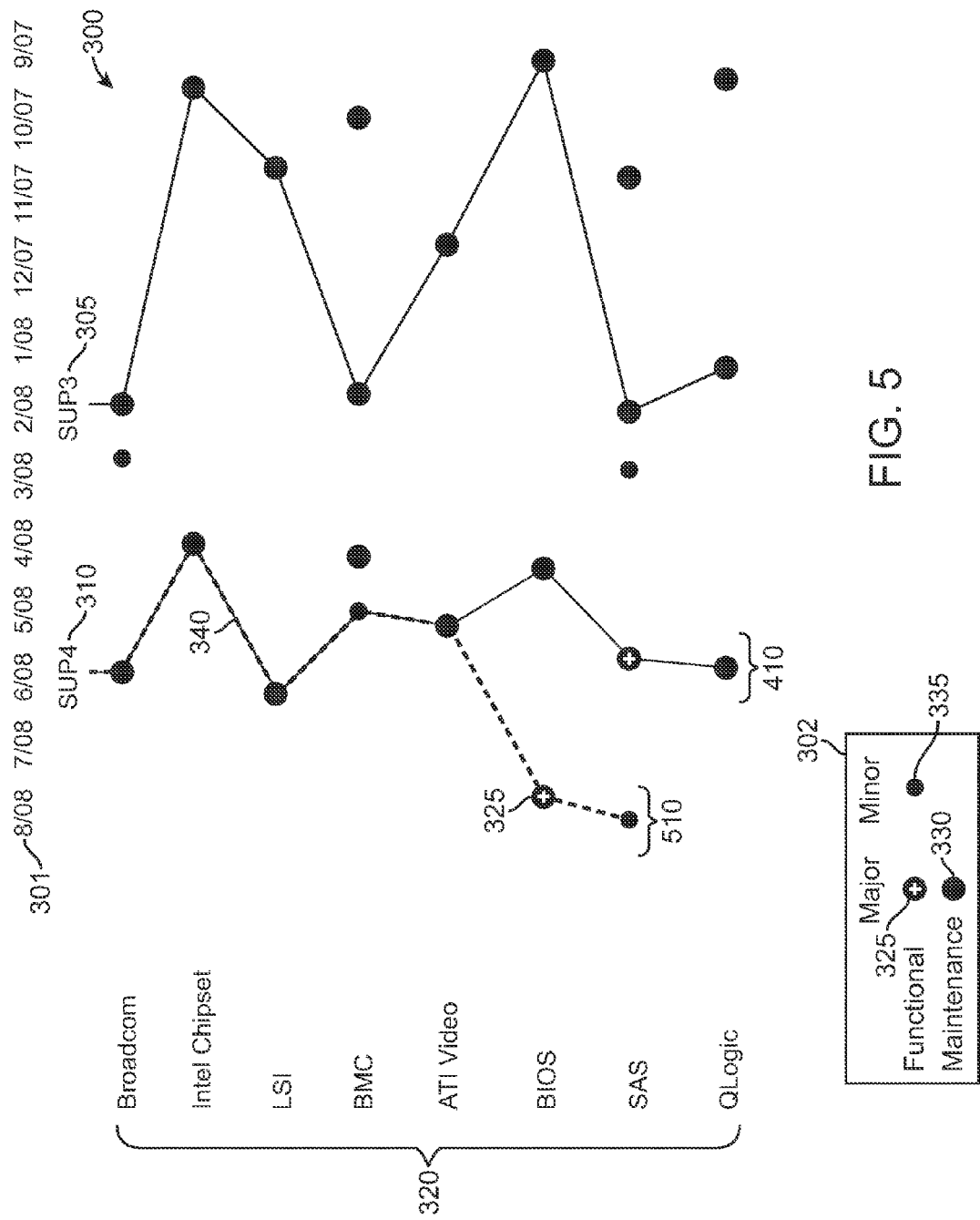
FIG. 5 illustrates an example user interface showing compatible update processing instruction packages including an input selection of possible incompatible update processing instruction packages according to one embodiment of the invention.

FIG. 5 illustrates the example GUI 300 where a user selection of SUP4 310 that had previously been made is modified based on a selection outside of the SUP4 310. In this example, the graphically linked and recommended path 410 of the processing instruction packages in SUP4 310 has been modified by the user to form path 510, which is now highlighted to show a user that all of the processing instruction packages in the path 510 are selected to be installed together on a system/device/network, and that the selection set, represented by path 510, varies somewhat from the guidance path 410.

In this example, the user may drag the path of the BIOS representation in the path 410 to the updated BIOS shown with a release date of August 2008 in this example. Upon the user releasing the dragged path on the newly selected representation of the BIOS instruction package, the mapping module 170 transmits the information to the linking module 160, which sends the linked compatible processing instruction packages back to the mapping module 170, which forms the new path 510 that now includes an update for the SAS (Serial Attached SCSI (Small Computer System Interface)) disk firmware instruction package with a release date of August 2008 instead of the previous SAS disk firmware instruction package having a release date of June 2008. As an alternative to dragging the selection path off the guidance path to include the latest SAS firmware, the user could simply click the outlying item with a pointing device, such as a mouse.

FIG. 6 illustrates the example GUI 300 where a user selection of SUP4 310 that had previously been made is modified based on a selection outside of the SUP4 310 to form selection path 510. In one embodiment of the invention, after the user selection has modified the graphical selection path to form path 510 by the mapping module 170, additional information 610 regarding the newly changed graphical path 510 is displayed on the GUI 300. In one embodiment of the invention, the GUI 300 may begin with two overlaying graphical paths. One may be denoted as the "guidance path" with the recommended default set of items, and the other may be denoted as the "selection path" that is the set of items that is selected. The user may then change the selection path to a different set by dragging the selection path or clicking on items to change the selection set. In some embodiments of the invention the guidance path is less dynamic then the selection path and may remain fixed during a user session. In other embodiments of the invention, selection path changes may be made in other portions of GUI 300, such as an update date or date range, a selection based n a particular number of known errors, a selection of a selection previous made by a particular user, etc.

In one implementation, the additional information 610 includes information such as, the identification of the group of compatible tracked updates (SUP) that was chosen/modified and the newly added most recent processing instruction packages, information regarding number of users that have used the same combination of processing instruction packages, number of reported issues, level of risk, and additional user ratings, comments and/or tips regarding the installation of the selected combination of processing instruction packages in the selection path 510.

In one implementation, the additional information 610 is retrieved from the memory 130 based on the information determined from the linking module 160. In one embodiment of the invention, the additional information 610 including the number of customers using the combination of processing instruction packages, number of reported issues and level of risk are entered via users via shared information, such as surveys, blogs, polls, feedback, etc.

In one implementation, other graphic feedback may be used, such as heat maps using less and more saturated colors to represent lower and higher values, respectively, of a given metric. Such metrics may include user feedback, surveys, vendor-supplied problem statistics, etc. In another example, instead of color, the size of the symbols representing the processing instruction packages can vary based on popularity, quality (e.g., based on error reports, compatibility issues, etc.). In yet another example, the GUI 300 may track a user's previous installation of updates using the tracking module 140 to store this information in memory 130.

In another implementation, instead of the GUI 300 being group-centric the display may be dynamically centered on specific processing instruction packages. In one example, a user may select one instruction package that he or she is in need of, then the compatible versions of other associated processing instruction packages may be highlighted as the "guidance path" (e.g., link lines radiating out from the initial choice for a needed instruction package, hide and/or block incompatible processing instruction packages, etc.). In another implementation, a best fit or latest levels that are known to be compatible together may be highlighted as the strongest based on assigned colors or saturation of color. Other implementations may use heuristics to show users who have installed one particular instruction package have also installed another specific instruction package.

In one embodiment of the invention, the level of risk is determined based on a ratio of the number of reported issues with respect to the number of users using the respective combination of processing instruction packages. In some embodiments of the invention risk may be determined algorithmically based on the age of the instruction package, number of interactions with other components, etc. In one or more embodiments of the invention the newer the update, the riskier it is (i.e., less proven than the previous known version); the more interdependencies of a component the riskier it set to be; the more an update supports something new or untested (e.g., UEFI), the riskier is set to be; the more frequently an instruction package is updated may also indicate the vendor supplier is having trouble getting it to work well, and this may make it potentially riskier.

Figure 7:
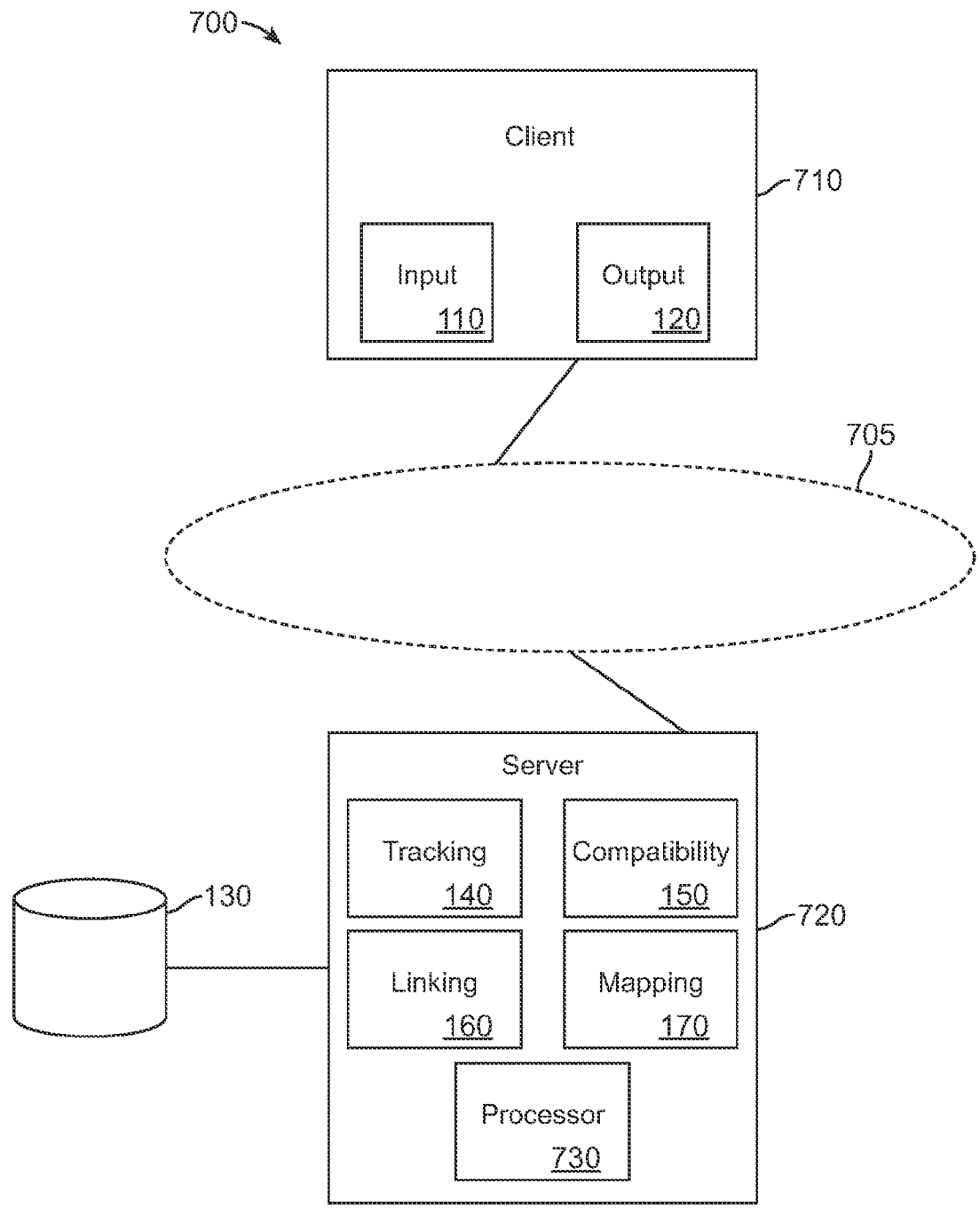
FIG. 7 illustrates a client-server system according to one embodiment of the invention.

FIG. 7 illustrates an example client-server system 700, implementing aspects of the invention similarly as with the system 100. In this embodiment of the invention, the tracking module 140, compatibility module 150, linking module 160 and mapping module 170 are implemented in the server device 720 along with a server processor 730, while the input module 110 and the output module 120 are implemented in the client device 710. In one example, the memory 130 is coupled to the server device 720. The client device 710 communicates with the server device 720 via a wired or wireless connection 705. The connection 705 may be a local area network (LAN), wireless LAN (WLAN), Internet, local network, home network, private network, etc.

In one embodiment of the invention, the mapping module 170 of system 700 provides graphically generated linked paths for compatible processing instruction packages for facilitating user update selection similarly with respect to the system 100. In one embodiment of the invention, a browser may be implemented in the client device 710 in connection with the input module 110 and output module 120 to communicate over the connection 705 with the server device 720.

In one or more embodiments of the invention, the server device 720 may employ various tools, functions, etc., available to the server device 720 based on operating systems, application software, database software, etc., for assisting with basic processing and utilized by the tracking module 140, compatibility module 150, linking module 160 and mapping module 170 to assist in the server device 720 providing graphically represented linked paths and information of compatible processing instruction packages.

Figure 8:
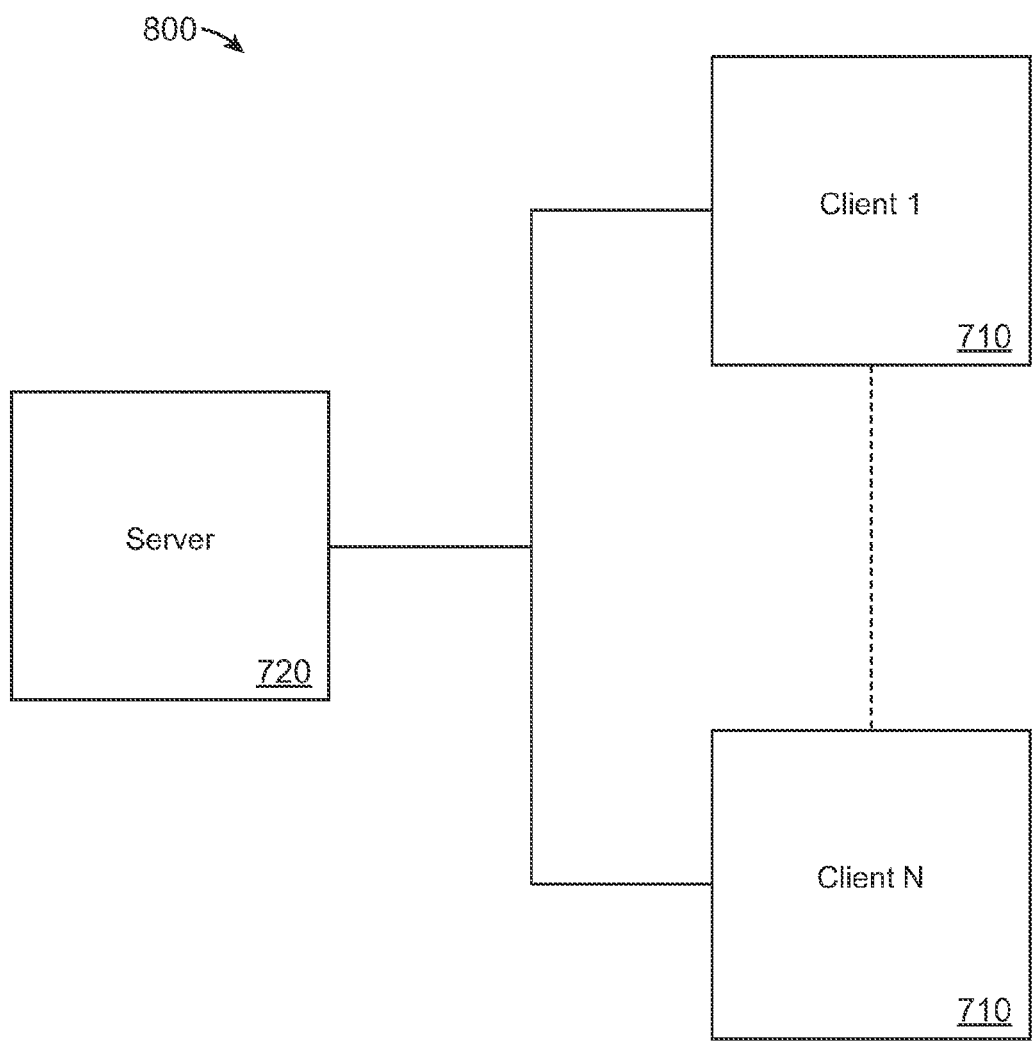
FIG. 8 illustrates a distributed system according to one embodiment of the invention.

FIG. 8 shows a block diagram of example architecture of an embodiment of a distributed system 800 providing graphical representations of linked compatible processing instruction packages to facilitate selection of updates according to an embodiment of the invention. In this embodiment of the invention, the distributed system 800 includes clients 1 710 through client N 710 that may be distributed, in any combination in a network of any of the following: a local area network (LAN), wireless LAN (WLAN), Internet, local network, home network, private network, etc., or any combination of network types, and connect to a server 720 via a wire or wireless network. In this embodiment of the invention, the server 720 performs similar functions as with the server 720 in system 700. The distributed clients 1-N 710 perform a similar function as with the client 710 in system 700.

In one embodiment of the invention where the distributed system 800 uses the Internet, the network represents a worldwide collection of networks and gateways that use the Transmission Control Protocol/Internet Protocol (TCP/IP) suite of protocols to communicate with one another. Included as central to the Internet is a backbone of high-speed data communication lines between major nodes or host computers, comprising a multitude (e.g., thousands, tens of thousands, etc.) of commercial, governmental, educational and other computer systems that route data and messages.

Figure 9:
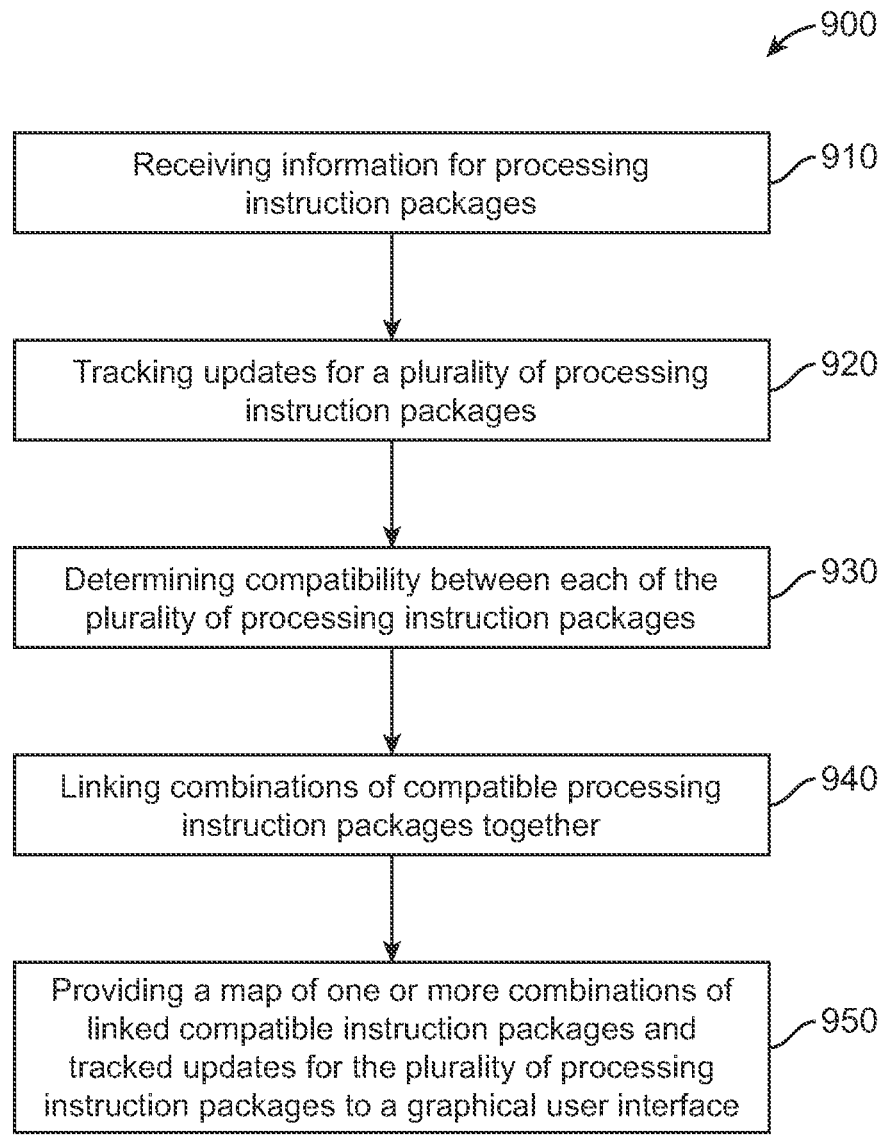
FIG. 9 illustrates a block diagram of a process according to one embodiment of the invention.

FIG. 9 illustrates a block diagram of an example process 900 for providing graphical representations of linked compatible processing instruction packages to facilitate selection of updates, according to an embodiment of the invention. In one or more embodiments of the invention, the details of the process 900 are similar in functionality with respect to one or more embodiments of the system 100 and the system 700, in particular to the functionality of the tracking module 140, compatibility module 150, linking module 160 and the mapping module 170 employed in the system 100 and the system 700.

According to the process 900, block 910 receives information related to a plurality of processing instruction packages. In one example, the information related to the processing instruction packages may be received from publishers of the processing instruction packages and stored in a database, matrix, etc., in a memory, such as memory 130.

Block 920 tracks information related to updates for the plurality of processing instruction packages and stores the information in a database, matrix, etc., in memory 130. In one implementation, compatibility information is included in the information related to updates of the processing instruction packages along with testing information, user information regarding use of particular combinations of processing instruction packages, etc., for including compatibility information in the tracked information for the processing instruction packages.

Block 930 retrieves the stored compatibility information in the memory 130 and determines the processing instruction packages that are considered to be compatible based on the retrieved information and stores the compatibility information in the memory 130. In one implementation, block 930 inputs an entry in a database, matrix, etc., for each instruction package regarding each other instruction package and vice versa to build the compatibility information.

Block 940 performs linking of combinations of compatible processing instruction packages by forming lists of compatible groups of processing instruction packages and stores the lists in a database, matrix, etc., in memory 130. Block 950 generates and provides a graphical map of one or more combinations of graphically linked compatible processing instruction packages and tracked updates for the processing instruction packages as output for presentation to a user, similarly as the mapping module 170 in the system 100 and the system 700. Additionally, process 900 may receive input from users via an input module, such as input module 110 in the system 100 and client 710 to modify a graphically represented linked path of compatible processing instruction packages to facilitate selection of processing instruction packages to reduce potential incompatibilities.

As is known to those skilled in the art, the aforementioned example architectures described above, according to the present invention, can be implemented in many ways, such as program instructions for execution by a processor, as software modules, microcode, as a computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart illustrated in FIG. 9 and block diagrams in FIGS. 1, 7 and 8 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I/O devices (including but not limited to keyboards, displays, pointing devices, resistive digitizers (i.e., touch screens), etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
a server device including:
    a tracking module that tracks updates for a plurality of processing instruction packages;
    a compatibility module that determines compatibility between each of the plurality of processing instruction packages;
    a linking module that links combinations of compatible processing instruction packages together; and
    a mapping module that provides a display of a graphical map of one or more combinations of linked compatible instruction packages, wherein the graphical map comprises a connected path between the linked compatible processing instruction packages, and the mapping module further provides tracked updates for the plurality of processing instruction packages as output for facilitating selection of updates for the plurality of processing instruction packages, wherein the graphical map of linked compatible processing instruction packages is modifiable based on selecting a change in the connected path to at least one processing instruction package in the graphical map by dragging the connected path to create a display of a new connected path including a new set of processing instruction packages, wherein the compatibility module determines compatibility between processing instruction packages based on heuristics and surveys, and additional information is displayed comprising level of risk of using the new set of processing instruction packages, and the mapping module provides a graphical map of a guidance path displayed with the graphical map of the one or more combinations of linked compatible processing instruction packages.

2. The system of claim 1, further comprising:
   a client device coupled with
      an input module configured for receiving commands from a user as input to display compatible processing instruction packages; and
      an output module configured for receiving the graphical map and tracked updates for the plurality of processing instruction packages from the server device.

3. The system of claim 2, wherein the linking module modifies linking of compatible processing instruction packages upon receiving an input from the input module to change a portion of the graphically linked path in the graphical map.

4. The system of claim 1, wherein the mapping module represents differences between available compatible processing instruction packages using graphical symbols on the graphical map for representing strength of compatibility, type of tracked update, and processing instruction packages that are installed together.

5. The system of claim 1, wherein the processing instruction packages comprises one of firmware, software downloads, and device drivers.

6. An apparatus comprising:
   a tracking module that tracks updates for a plurality of processing instruction packages;
   a compatibility module that determines compatibility between each of the plurality of processing instruction packages;
   a linking module that links combinations of compatible processing instruction packages together; and
   a mapping module that provides a display of a graphical map of one or more combinations of linked compatible processing instruction packages, wherein the graphical map comprises a connected path between the linked compatible processing instruction packages, the mapping module further provides tracked updates for the plurality of processing instruction packages to a user interface for facilitating selection of tracked updates for the plurality of processing instruction packages, wherein the graphical map of linked compatible processing instruction packages is modifiable based on selecting a change in the connected path to at least one processing instruction package in the graphical map by dragging the connected path to create a display of a new connected path including a new set of processing instruction packages, wherein compatibility between processing instruction packages is known based on heuristics and surveys, and additional information is displayed based on the new set of processing instruction packages, and the mapping module provides a graphical map of a guidance path displayed with the graphical map of the one or more combinations of linked compatible processing instruction packages.

7. The apparatus of claim 6, wherein the updates comprise information including type of device a tracked update is targeted for, a release date of each tracked update, type of tracked update, and assigned importance level for each tracked update.

8. The apparatus of claim 6, wherein the graphical map graphically links the combinations of compatible processing instruction packages together in the new connected path that is displayed.

9. The apparatus of claim 8, wherein the mapping module provides differences between available compatible processing instruction packages that are represented using graphical symbols on the graphical map representing strength of compatibility, type of tracked update, and processing instruction packages that are installed together.

10. A method comprising:
   employing a processor for
      tracking updates for a plurality of processing instruction packages;
      determining compatibility between each of the plurality of processing instruction packages;
      linking combinations of compatible processing instruction packages together;
      providing a display of a graphical map of one or more combinations of linked compatible processing instruction packages, wherein the graphical map comprises a displayed connected path between the linked compatible processing instruction packages, and providing tracked updates for the plurality of processing instruction packages to a graphical user interface for facilitating selection of updates for the plurality of processing instruction packages, wherein the graphical map of linked compatible processing instruction packages is modifiable based on selecting a change in the connected path to at least one processing instruction package in the graphical map by dragging the connected path to create a display of a new connected path including a new set of processing instruction packages; and
   displaying a graphical map of a guidance path with the graphical map of the one or more combinations of linked compatible processing instruction packages, wherein compatibility between processing instruction packages is known based on heuristics and surveys, and additional information is displayed based on the new set of processing instruction packages.

11. The method of claim 10, wherein tracking updates further comprises tracking type of devices a tracked update is targeted for, release dates of each tracked update, type of tracked update, and assigned importance level for each tracked update.

12. The method of claim 10, wherein determining compatibility further comprises:
   obtaining heuristics of tracked update compatibilities and survey results; and
   matching known compatibilities between existing updates for processing instruction packages.

13. The method of claim 10, wherein linking further comprises graphically linking symbols representing combinations of compatible processing instruction packages together, and wherein additional information is displayed comprising reported issues based on the new set of processing instruction packages.

14. A computer program product for mapping compatible processing instruction packages comprising:

a non-transitory computer usable medium having computer readable program code embodied therewith, the computer readable program code comprising:
computer readable program code configured to
track updates for a plurality of processing instruction packages;
determine compatibility between each of the plurality of processing instruction packages;
link combinations of compatible processing instruction packages together;
provide a display of a graphical map of one or more combinations of linked compatible instruction packages, wherein the graphical map comprises a displayed connected path between the linked compatible processing instruction packages, and provide tracked updates for the plurality of processing instruction packages to a graphical user interface for facilitating selection of updates for the plurality of processing instruction packages, wherein the graphical map of linked compatible processing instruction packages is modifiable based on selecting a change in the connected path to at least one processing instruction package in the graphical map by dragging the connected path to create a display of a new connected path including a new set of processing instruction packages; and
display a graphical map of a guidance path with the graphical map of the one or more combinations of linked compatible processing instruction packages,
wherein compatibility between processing instruction packages is known based on heuristics and surveys, and additional information is displayed based on the new set of processing instruction packages.

15. The computer program product of claim 14, wherein tracking updates further comprises causing the computer to track type of devices an update is targeted for, release dates of each update, type of update, and assigned importance level for each update.

16. The computer program product of claim 14, wherein determining compatibility further causes the computer to:
obtain heuristics of update compatibilities and survey results; and
match known compatibilities between existing updates for processing instruction packages.

17. The computer program product of claim 14, wherein the computer is further caused to:
display additional information comprising reported issues based on the new set of processing instruction packages.

* * * * *